US012284056B2

(12) United States Patent
Nandy et al.

(10) Patent No.: US 12,284,056 B2
(45) Date of Patent: Apr. 22, 2025

(54) SERVICE DISCOVERY ACROSS TUNNEL ENDPOINTS IN OVERLAYS

(71) Applicant: Hewlett Packard Enterprise Development LP, Spring, TX (US)

(72) Inventors: Tathagata Nandy, Karnataka (IN); Venkatavaradhan Devarajan, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 117 days.

(21) Appl. No.: 18/067,813

(22) Filed: Dec. 19, 2022

(65) Prior Publication Data

US 2024/0205048 A1 Jun. 20, 2024

(51) Int. Cl.
*H04L 12/46* (2006.01)
*H04L 12/18* (2006.01)
*H04L 45/00* (2022.01)

(52) U.S. Cl.
CPC ........ *H04L 12/4633* (2013.01); *H04L 12/185* (2013.01); *H04L 45/26* (2013.01); *H04L 45/66* (2013.01)

(58) Field of Classification Search
None
See application file for complete search history.

(56) References Cited

U.S. PATENT DOCUMENTS 9,369,473 B2 6/2016 Janakiraman et al.
10,091,065 B1 10/2018 Gast et al.
2016/0226818 A1* 8/2016 Kamath ............... H04L 12/4633
2016/0352531 A1* 12/2016 Shen, IV ............. H04L 12/4641
2018/0131775 A1* 5/2018 Devarajan ........... H04L 12/4641
2021/0392192 A1* 12/2021 Machikoppa ......... H04L 67/568
2022/0131786 A1* 4/2022 Nandy .................... H04L 45/64

OTHER PUBLICATIONS

Bhandari, S. et al., "Extending Multicast DNS Across Local Links in Campus and Enterprise Networks", Oct. 20, 2013, 15 pages.
Kachalia, R., "Cisco DNA Service for Bonjour," Jan. 29-Feb. 2, 2018, Cisco, BRKCRS-2120, 73 pages.

* cited by examiner

*Primary Examiner* — June Sison
(74) *Attorney, Agent, or Firm* — Hewlett Packard Enterprise Patent Department

(57) ABSTRACT

In an example, a network device may receive, from a client device, a multicast query for a service advertised by a host device connected to another network device. The network device is configured as a first Virtual tunnel endpoint (VTEP) and the other network device is configured as a second VTEP in an overlay network. The network device may determine whether a host name, of the host device, corresponding to the service name in the multicast query is present in a resource record. In response to determining that the host name is present in the resource record, the network device may identify, from the resource record, an overlay network path corresponding to the host name. The network device may encapsulate the multicast query based on an overlay encapsulation protocol implemented at the first VTEP and route, the encapsulated multicast query, via the overlay network path, to the host device.

20 Claims, 7 Drawing Sheets

SERVICE DISCOVERY ACROSS TUNNEL ENDPOINTS IN OVERLAYS

BACKGROUND

Networks may include resources connected by communication links, and may be used to connect people, provide services (e.g., internally and/or externally via the Internet and/or intranet), and/or organize information, among other activities. The network may also include host devices (such as printers, scanners, fax machines, media streaming devices, networked projectors, surveillance systems, IP phones, etc.) which may host different service functionalities to be accessed by client devices (such as computers, laptops, handheld devices, smartphones, etc.) in the network.

Service discovery includes detection of host devices and services offered by those host devices on a computer network. Service discovery requires a common language and/or protocol to enable client devices to make use of services hosted by the host devices without the need of continuous user intervention and aims to reduce the configuration efforts from users/network administrators. Service discovery also allows applications to access services that host devices provide on a local network.

BRIEF DESCRIPTION OF THE DRAWINGS

For a more complete understanding of the present disclosure, examples in accordance with the various features described herein may be more readily understood with reference to the following detailed description taken in conjunction with the accompanying drawings, where like reference numerals designate like structural elements, and in which.

Figure 1:
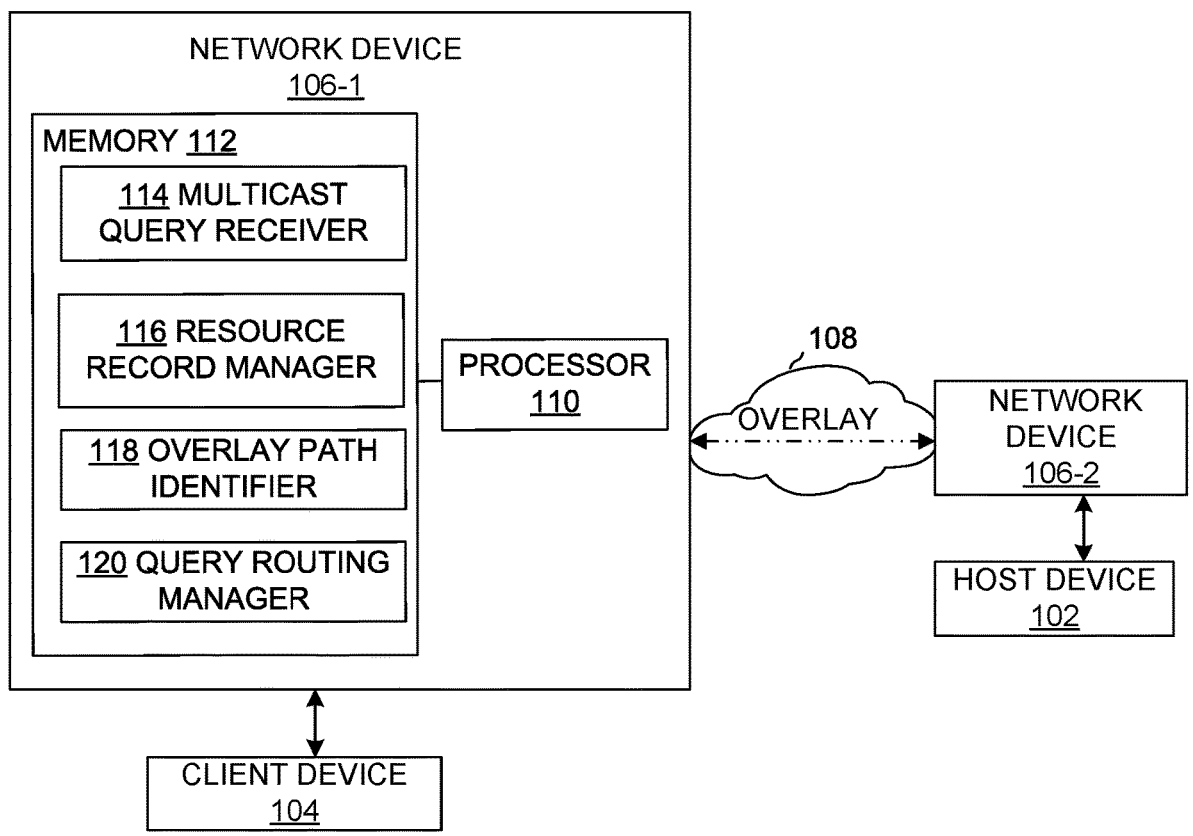
FIG. 1 schematically illustrates a network environment for service discovery across Virtual Tunnel Endpoints (VTEPs) in an overlay network, according to an example.

Certain examples have features that are in addition to or in lieu of the features illustrated in the above-referenced figures. Certain labels may be omitted from certain figures for the sake of clarity.

DETAILED DESCRIPTION

In the present disclosure, the use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

As used herein, the term "Layer 2 (L2)" refers to the data link layer, i.e., the second level in the seven-layer Open System Interconnection (OSI) reference model for network protocol design. Layer 2 is the protocol layer used to transfer data between adjacent network nodes within a wide area network or between nodes on the same local area network. The term "Layer 3 (L3)", also known as the Network Layer, is the third level in the seven-layer OSI reference model for network protocol design. L3 is the protocol layer which provides the functional and procedural means to transfer data from a source host on one network to a destination host on a different network (in contrast to the data link layer which connects hosts within the same network). L3 performs network routing functions, and may also perform fragmentation and reassembly, and report delivery errors. The term "network virtualization technologies" refer to frameworks/protocols for overlaying virtualized L2 networks over L3 networks by defining both an encapsulation mechanism and a control plane. The term "virtual tunnel" refers to a virtual communication link carrying encapsulated traffic between two nodes in an overlay network. The term "host device" refers to a computing entity that can be accessed by clients and that can host different services (such as streaming radio and/or video services, cable and/or satellite television services, multimedia streaming service, printer service, etc.) for the clients. The term "client device" refers to a computing entity that can discover and access services hosted by the host devices. The term "multicast" refers to transmission of data packets from one or more sources to a group of destination devices. The group may be defined by a single multicast IP address.

Further, the term "service discovery protocols" refer to sets of rules used for announcement of services hosted by host devices and discovery of the services by client devices through exchange of multicast IP packets. The term "subnet" refers to a logical subdivision of an IP network. Thus, a subnet is a network segment in layer 3. The term "L2 overlay network" refers to an overlay network that allows host devices in the same subnet to send bridged or Layer 2 traffic to each other. The L2 overlay network forwards the bridged traffic between two VTEPs in the network using an L2 virtual network instance (VNI). The term "L2 virtual network instance (VNI)" refers to an identifier for VTEPs connected to hosts/clients in the same subnet. The term "L3 overlay network" refers to an overlay network that allows host devices in the different subnets to send L3 traffic or routed traffic to each other. The L3 overlay network forwards the routed traffic between two VTEPs in the network using an L3 virtual network instance (VNI) and a virtual router (i.e., a virtual routing and forwarding (VRF) instance). The term "L3 virtual network instance (VNI)" refers to an identifier for VTEPs connected to hosts/clients in different subnets.

A computer network may comprise overlays and underlays. Overlay refers to a software-defined virtual network of nodes and/or logical links deployed on top of a physical network infrastructure of network devices. A layer 2 (L2) network may be stretched across a layer 3 (L3) network by implementing overlays. An overlay may be implemented using different network virtualization technologies which allow abstracting hardware network resources to software. Underlay refers to the physical network infrastructure of network devices on which the overlay is implemented. Nodes in an overlay are called virtual tunnel endpoints (VTEPs). VTEPs may be physical or virtual network devices that perform encapsulation and decapsulation of packets transported through the overlay. The VTEPs may connect to each other via virtual tunnels in the overlay. Overlays provide flexibility in packet forwarding, service addition, protocol implementations, and on-demand allocation of virtual network resources without modifying/re-configuring the physical network infrastructure, i.e., the underlay. Thus, overlays are predominantly used in campus and enterprise networks.

Service discovery in campus and enterprise networks is generally carried out by using service discovery protocols, such as multicast Domain Name System (mDNS), DNS-Service Discovery (DNS-SD), Lightweight Service Discovery (LSD), and Multicast Source Discovery Protocol (MSDP). The service discovery protocols work by forwarding multicast queries from client devices to host devices and multicast responses from host devices back to the client devices. In a network implementing an overlay, a client device and a host device may connect to VTEPs. So long as both the client device and the host device, are connected to the same VTEP, a service advertised by the host device may be discovered by the client device. In such a scenario, when a client device needs to resolve a hostname, it sends a multicast query to its connected VTEP asking a host device having that hostname to identify itself. The VTEP connected to the client device may flood the multicast query to all its access ports. Thus, all host devices in the subnet of the client device, connected to the access ports of the VTEP, may receive the multicast query. In response, the host device, having the queried hostname, may multicast a message that includes its IP address. The VTEP may also flood this response from the host device to all its access ports in the same subnet. All other clients and hosts in the subnet can then use that information to update their caches. Thus, the client device may resolve an IP address associated with a host device connected to the same VTEP and discover a service hosted by the host device. However, often a client device may connect to one VTEP and a host device may connect to a different VTEP. In such a scenario, for the client device to discover services of the host device, multicast queries/responses need to be exchanged between two different VTEPs through the overlay. However, the VTEPs do not have capabilities to route the multicast queries/responses to other VTEPs through the overlay. Thus, when a client device and a host device are connected to two different VTEPs in an overlay, it may be challenging for the client device to discover a service advertised by the host device.

Further, the service discovery protocols generally use link local addresses to send/receive the multicast queries/responses. A link local address is a network address which is unique within a single subnet and therefore link local address of a device can be used only for communications within the subnet that the device is connected to. Since link local addresses may not be unique beyond their subnet and the multicast queries/responses are forwarded using these link local addresses, the multicast queries/responses, by design, are not routed across different subnets. As the multicast queries/responses are not routed across subnets, a client, in one subnet, connected to a VTEP may be unable to discover services of a host, in another subnet, connected to a different VTEP. Therefore, service discovery across devices connected to different VTEPs in an overlay involves additional challenges.

For service discovery across client and hosts connected to different VTEPs in an overlay, allowing the VTEPs to forward multicast queries/responses via overlays may be useful. However, with forwarding of multicast queries/responses via overlays being allowed, all VTEPs in the overlay may get flooded with the multicast queries/responses. Flooding of multicast queries/responses at all VTEPs utilizes computing resources at the VTEPs and consumes data bandwidth of the overlay. When the number of multicast queries/responses increase, the overlay network may experience bandwidth issues.

Furthermore, service discovery is expected to be location specific. For example, a teacher in classroom 1 in a school campus may intend to access a smart board installed in his/her proximity, say, inside classroom 1 or an engineering staff in Building1-Floor3 in an office campus may intend to access a printer installed in his proximity, say, in the same building and floor. Discovery of a smart board in a different classroom or a printer in a different building may be irrelevant and not useful for the teacher or the engineering staff. Thus, discovery of a service and/or a host device away from the location of the client device may be irrelevant to the user and hence not useful. With flooding of all VTEPs in the overlay with the multicast queries/responses, the client devices connected to those VTEPs may send multicast queries to host devices which may not be in their proximity and also receive multicast responses from those hosts. Such multicast responses from geographically remote host devices may be irrelevant and not useful to a user of the client device. In distributed networks, where bandwidth usage costs are high, the transmission of such irrelevant queries and responses through the overlay consumes data bandwidth and may be considered as an additional bandwidth cost.

The examples disclosed herein allow selective routing of multicast queries/responses across VTEPs using an overlay network path between a client device requesting a service and a host device providing the service. In particular, the multicast queries from a client are forwarded via overlay network paths only to those VTEPs which are connected to host devices that provide the service, rather than flooding all VTEPs in the overlay with the multicast queries. This allows a client connected to one VTEP to discover a service provided by a host device connected to a different VTEP in the overlay without flooding the VTEPs with service queries from the clients thereby avoiding additional bandwidth consumption and additional computing resource usage in the overlay.

Further, in an example, the overlay network path of the host device is identified based on a location tag indicative of a location of the client device. Particularly, the overlay network path to a host device having a location tag common to that of the client device is identified. Thus, the multicast queries from clients are routed along the overlay network path based on the location of the client device. Routing the multicast query along the overlay network path identified based on the location of the client device allows location-specific discovery of the host device and its service. Since the discovery of the host device is location specific, multicast responses from geographically remote host devices may not be forwarded to the client device thereby reducing transmission of irrelevant responses from the host devices that are not in close proximity of the client device. This prevents wasteful consumption of data bandwidth in the overlay.

Accordingly, various examples disclosed herein relate to methods and systems for service discovery across VTEPs in an overlay network. In some examples, a first network device, configured as a first VTEP in an overlay network, receives a multicast query for a service from a client device connected to the network device. The multicast query comprises a service name of the service being queried by the client device. The multicast query may indicate that the client device intends to access the service denoted by the service name. The service may be provided by a host device connected to a second network device configured as a second VTEP in the overlay network. The first network device may store a resource record comprising a list of host names, respective host IP addresses, respective service names, and respective overlay network paths for host devices connected to VTEPs in the overlay network. An overlay network path refers to reachability information of a host device via the overlay network. In some examples, the reachability information may identify a virtual tunnel connecting two different VTEPs in the overlay network. The overlay network path may comprise an L2 Virtual Network Instance (VNI) used to forward traffic in an L2 overlay network or an L3 VNI used to forward traffic in an L3 overlay network and an IP address of the second VTEP connected to the host device.

The first network device may create the resource record based on encapsulated multicast service announcements received from other VTEPs in the overlay network. In response to determining that the host name corresponding to the service name is present in the resource record, the first network device identifies, from the resource record, an overlay network path corresponding to the host name. The overlay network path is indicative of reachability information of the host device in the overlay network. Further, the first network device encapsulates the multicast query based on an overlay encapsulation protocol implemented at the first VTEP. The encapsulated multicast service query comprises at least a portion of the overlay network path. The first network device (implementing the first VTEP) then routes the encapsulated multicast service query, via the overlay network path, to the host device, such that the service is discoverable by the client device. Thus, a multicast query for a service from a client device (connected to a VTEP) may be sent via the overlay network path, to selective VTEPs (connected to hosts providing the service) in an overlay network. This allows service discovery across VTEPs in an overlay while avoiding flooding of multicast queries/responses at the VTEPs consequently preventing additional bandwidth consumption and additional computing resource usage in the overlay.

The above systems and methods are further described with reference to FIG. 1 to FIG. 6. It should be noted that the description and figures merely illustrate the principles of the present subject matter along with examples described herein and, should not be construed as a limitation to the present subject matter. It is thus understood that various arrangements may be devised that, although not explicitly described or shown herein, embody the principles of the present subject matter. Moreover, all statements herein reciting principles, aspects, and embodiments of the present subject matter, as well as specific examples thereof, are intended to encompass equivalents thereof.

FIG. 1 schematically illustrates a network environment 100. In an example, the network environment 100 may be a computer network made up of an interconnection of LANs within a limited geographical area. In one example, the network environment 100 may include a campus network. In some examples, the network environment 100 may be a wired network, a wireless network, or a combination thereof. The network environment 100 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other.

As shown in FIG. 1, the network environment 100 includes a host device 102. A "host device" refers to a computing entity that can be accessed by clients and that can host different services (such as streaming radio and/or video services, cable and/or satellite television services, multimedia streaming services, printer services, etc.) for the clients. The host device 102 may be capable of advertising one or more services. A service may refer to a specific functionality that the host device 102 may provide, in some examples, by executing an application at the host device 102. Host devices may include servers that send or receive data, services or applications. The host device 102 may communicate with client devices or other host devices on the network environment 100 over physical links via switches or, in some examples, via wireless communication links.

The network environment 100 also includes a client device 104 which can communicate with the host device. A "client device" refers to a computing entity that can discover and access services hosted by the host devices. Examples of client devices include, computers, laptops, tablets, PDA, and other computing devices which may be used to run applications to access different service functionalities provided by the host devices. In the network environment 100, the client device 104 may access the services hosted by the host device 102. Although, in FIG. 1, a single host device 102 and a single client device 104 is shown, in some examples, there may be multiple host devices and multiple client devices.

The network environment 100 includes network devices 106-1 and 106-2, collectively referred to as network devices 106. Each of the network devices 106 may be implemented as, but not limited to, a switching unit, a switch-router, a gateway, or any device capable of switching data packets provide connectivity between hosts and clients in a computer network, such as the network environment 100. As shown in FIG. 1, the client device 104 is locally connected to network device 106-1. In some examples, the client device 104 may be connected to an access port of the network device 106-1 via an ethernet cable. In some examples, the client device 104 may be a wireless device which may connect to the network device 106-1 via a wireless access point (not shown), i.e., the client device may wirelessly connect to the wireless access point which in turn may be connected to an access port of the network device 106-1. As shown in FIG. 1, the host device 102 is locally connected to network device 106-2. In some examples, the host device 102 may be connected to an access port of the network device 106-2 via an ethernet cable.

The client device 104 may communicate with the host device 102 via the network devices 106. In some examples, the network devices 106 may be connected via an overlay network 108 extending therebetween. "Overlay" refers to a software-defined virtual network of nodes and/or logical links deployed on top of a physical network infrastructure of network devices. An L2 network may be stretched across a L3 network by implementing overlays. An overlay may be implemented using different network virtualization technologies which allow abstracting hardware network resources to software. Examples of different network virtualization technologies include Virtual Extensible Local Area Networks (VXLANs), Generic Routing Encapsulation (GRE), and Network Virtualization using Generic Routing Encapsulation (NVGRE). As explained earlier, an overlay may include VTEPs which may be either virtual or physical switch ports. The VTEPs may encapsulate data packets entering the overlay from a source device and decapsulate the data packets when they leave the overlay. The overlay 108 may be deployed using an underlying layer of switches referred to as the underlay (not shown). In the overlay 108, the network device 106-1 is configured as a VTEP and the network device 106-2 is configured as another VTEP. In some examples, the VTEP implemented at the network device 106-1 is referred to as a first VTEP or a client-side VTEP and the VTEP implemented at the network device 106-2 is referred to as a second VTEP or a host-side VTEP. The VTEPs may connect to each other via virtual tunnels in the overlay 108.

In some examples, the client device 104 and the host device 102 may be in a single broadcast domain, i.e., they are part of a single Virtual Local Area Network (VLAN). In some examples, the client device 104 and the host device 102 are in different broadcast domains i.e., they are part of different VLANs. In some examples, the first VTEP (configured at network device 106-1) and the second VTEP (configured at network device 106-2) are in a single overlay network segment identified by a common L2VNI. An overlay network segment refers to a single L2 overlay network where devices are configured in a single broadcast domain/subnet. In some examples, the first VTEP is in a first overlay network segment identified by a first L2VNI and the second VTEP is in a second overlay network segment identified by a second L2VNI. Thus, the first and second VTEPs are in two different L2 overlay networks and may communicate via an L3VNI. In some examples, the first VTEP is in a first overlay network fabric and the second VTEP is in a second overlay network fabric. An overlay network fabric refers to an overlay network wherein each VTEP connects with another VTEP over a mesh connection, i.e., each VTEP in the overlay network is connected to every other VTEP via a virtual tunnel.

As shown in FIG. 1, the network device 106-1 may include a processor 110 and a memory 112 that may be coupled to each other through a communication link (e.g., a bus). Processor 110 may include a single or multiple Central Processing Units (CPU) or another suitable hardware processor(s), such as a network ASIC. Memory 112 may be a machine-readable storage medium that may store machine readable instructions executed by processor 110. Memory 112 may include any suitable combination of volatile and/or non-volatile memory, such as combinations of Random Access Memory (RAM), Read-Only Memory (ROM), flash memory, and/or other suitable memory.

Memory 112 stores instructions to be executed by processor 152 including instructions for multicast query receiver 114, resource record manager 116, overlay path identifier 118, and query routing manager 120.

The processor 110 may execute a multicast query receiver 114 to receive a multicast query, for a service, from the client device 104. In some examples, the multicast query refers to a multicast IP packet based on service discovery protocols originating from a client device attempting to access a specific service in a network. The multicast query may comprise a service name of the service that the client device is attempting to access. Consider that in the example of FIG. 1, the client device 104 attempts to access a service provided by the host device 102. In some examples, the multicast query may be a service query based on multicast Domain Name System (mDNS) protocol. In some examples, the multicast query comprises an SRV record and a TXT record of mDNS. A Service record (SRV record) refers to a specification of data in DNS defining the hostname and port number, of a host device providing the service that is queried by the client device. A TXT refers to a specification of data in DNS that allows a domain administrator to associate text values (strings) with domain names of host devices. In some examples, the service name of the service queried by the client device 104 may be included in the SRV records or the TXT records.

On receiving the multicast query for the service, the processor 110 may execute the resource record manager 116 to determine whether a host name, corresponding to the service name, is present in a resource record of the network device 106-1. In the example of FIG. 1, the host name is that of the host device 102 which provides the service. In some examples, the resource record comprises a list of host names of host devices connected to VTEPs in the overlay network 108, respective service names, respective IP addresses, and respective overlay network paths. In some examples, the resource record may also comprise respective role tags and location tags for each of the host devices. The role tag is indicative of role-based access policies of the client device 104 and the location tag is indicative of a geographical region where the client device 104 is located. The resource record may be created based on multicast service announcements received from host devices connected to VTEPs in the overlay 108.

In some examples, the processor 110 may execute the resource record manager 116 to determine whether the host name corresponds to a role tag and a location tag of the client device 104. The processor 110 may assign a role tag to the client device 104 based on one of a port address via which the client device 104 is connected to the network device 106-1, a MAC address of the client device 104, or based on authentication information of the client device 104. In some examples, the network device 106-1 may be configured such that an access port of the network device 106-1 is assigned to a particular role. Thus, based on the port at which the client device 104 is connected to the network device 106-1, the processor 110 may assign a role tag to the client device. Similarly, a MAC address to role mapping may be configured in the network device 106-1. Using the MAC address to role mapping and the client device's MAC address, the network device 106-1 may assign a role tag to the client device 104. In some examples, the assignment of a role tag to the client device 104 is performed by an authentication server (such as RADIUS). When the client device 104 connects to the network device 106-1 and provides its authentication credentials, then based on its authentication credentials, the authentication server may assign a role tag to the client device 104 and share the role tag with the network device 106-1. The network device 106-1 may apply access policies and privileges based on the assigned role tag.

The processor 110 may assign a location tag to the client device 104 either statically or based on the location of a wireless access point from which the multicast query is received. On identifying the role tag and location tag, the processor 110 may execute the resource record manager 116 to check the resource record to determine whether the host name corresponds to the role tag and the location tag of the client device 104. That is, the resource record manager 116 may check whether the role tag and location tag of the host device 102 matches with the role tag and location tag of the client device 104 in addition to checking whether the queried service is provided by the host device 102.

In response to determining that the host name, corresponding to the service name, role tag, and location tag, is present in the resource record, the processor 110 may execute the overlay path identifier 118 to identify, from the resource record, an overlay network path corresponding to the host name. The overlay network path is indicative of reachability information of the host device 102 in the overlay network 108. In some examples, the overlay network path comprises an L2 Virtual Network Instance (VNI) used to forward traffic in an L2 overlay network or an L3 VNI used to forward traffic in an L3 overlay network and an IP address of a destination VTEP connected with the host device (i.e., the IP address of the second VTEP connected to the host device 102 in this example). L2VNI refers to an identifier for VTEPs connected to hosts/clients in the same subnet. Thus, an L2VNI is a specific overlay network segment comprising endpoints (VTEPs) within the same IP subnet. L2 overlay network refers to an overlay network that allows host/client devices in the same subnet to send bridged or Layer 2 traffic to each other. In an L2 overlay network, bridged traffic between two VTEPs may be forwarded using an L2VNI. L3VNI refers to an identifier for VTEPs connected to hosts/clients in different subnets. Thus, an L3VNI is a specific overlay network segment comprising endpoints (VTEPs) in different IP subnets. L3 overlay network refers to an overlay network that allows host/client devices in the different subnets to send L3 traffic or routed traffic to each other. In an L3 overlay network, routed traffic between two VTEPs may be forwarded using an L3VNI and a virtual router (i.e., a virtual routing and forwarding (VRF) instance). The overlay network path provides a virtual communication link between the first VTEP (configured at network device 106-1) connected to client device 104 and the second VTEP (configured at network device 106-2) connected to host device 102 via the overlay 108. In some examples, the virtual communication link may be a virtual tunnel connecting the first VTEP and the second VTEP.

Once the overlay network path is identified, the processor 110 may execute the query routing manager 120 to encapsulate the multicast query and route the encapsulated multicast query, via the overlay network path, to the host device 102. In some examples, the query routing manager 120 may implement an overlay encapsulation protocol at the first VTEP to encapsulate the multicast query. The overlay encapsulation protocol also called a tunneling protocol is a communication protocols in which logically separate functions in a network (the overlay) are abstracted from their underlying structures (the underlay) by implementing higher-level objects. Examples include GENEVE, GRE, SSH, VXLAN, and NVGRE. As a result of encapsulation one or more headers may be added to the multicast query. At least a portion of the overlay network path may be included in one of the headers. In some examples, the portion of the overlay network path included in the headers comprises the IP address of the second VTEP connected to the host device 102. In some examples, the encapsulation may be VXLAN encapsulation of a Media Access Control (MAC) frame within a User Datagram Protocol (UDP) datagram for transport across an IP network. In some examples, the encapsulated multicast query may be routed via the overlay network path, i.e., the virtual tunnels identified by the L2VNI and/or L3VNI and the IP address of the second VTEP. On being routed along the overlay network path, the multicast query may reach the second VTEP and finally to host device 102. On receiving the multicast query the host device 102 may send a response agreeing to provide the service along the same overlay network path. Thus, the client device 104 connected to a VTEP (first VTEP in the overlay 108) may discover and access the service advertised by the host device 102 connected to a different VTEP (i.e., the second VTEP in the overlay 108) via the overlay network path. Identification of the overlay network path allows routing the multicast query in a specific route, (i.e., from client-side VTEP (first VTEP) to the host-side VTEP (second VTEP) via a virtual tunnel) which prevents unnecessary flooding of the multicast query to other VTEPs in the overlay, thereby preventing wasteful bandwidth consumption in the overlay 108. Further, since in some examples, the overlay network path is identified based on a match of the location tag of the host device with that of the client device, the multicast query also gets routed along the overlay network path to location-specific host devices, thereby allowing the service discovery to be location-specific.

Figure 2:
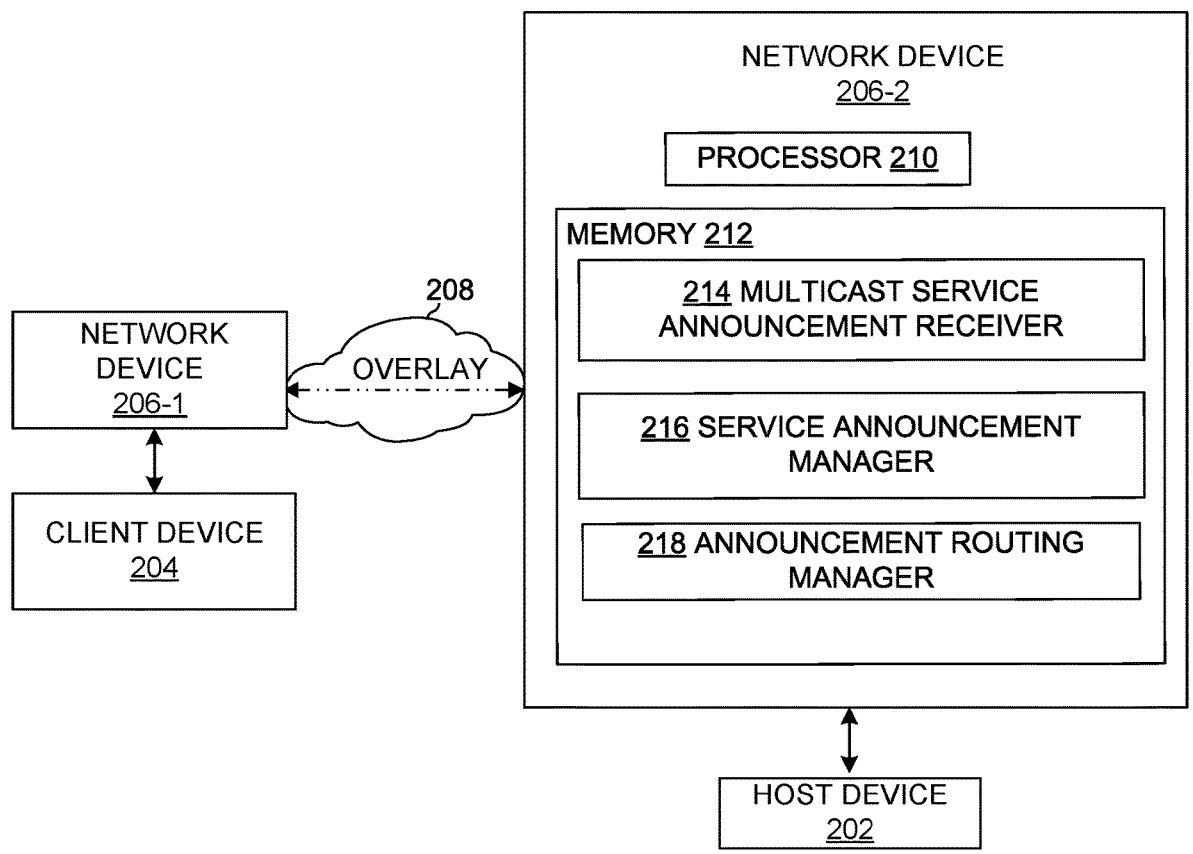
FIG. 2 schematically illustrates another network environment for service discovery across VTEPs in an overlay network, according to an example.

FIG. 2 schematically illustrates a network environment 200. In an example, the network environment 200 may be a computer network made up of an interconnection of LANs within a limited geographical area. In one example, the network environment 200 may include a campus network. In some examples, the network environment 200 may be a wired network, a wireless network, or a combination thereof. The network environment 200 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other.

As shown in FIG. 2, the network environment 200 includes a host device 202 and a client device 204 which can communicate with the host device 202. The host device 202 may be similar to the host device 102 and the client device 204 may be similar to the client device 104. Although, in FIG. 2, a single host device 202 and a single client device 204 is shown, in some examples, there may be multiple host devices and multiple client devices in the network environment 200.

The network environment 200 further includes network devices 206-1 and 206-2, collectively referred to as network devices 206. The network devices 206 may be similar to network devices 106 of FIG. 1. In some examples, the client device 204 may be connected to an access port of the network device 206-1 via an ethernet cable. In some examples, the client device 204 may be a wireless device which may connect to the network device 206-1 via a wireless access point (not shown), i.e., the client device may wirelessly connect to the wireless access point which in turn may be connected to an access port of the network device 206-1. As shown in FIG. 2, the host device 202 is locally connected to network device 206-2. In some examples, the host device 202 may be connected to an access port of the network device 206-2 via an ethernet cable.

The client device 204 may communicate with the host device 202 via the network devices 206. In some examples, the network devices 206 may be connected via an overlay network 208 extending therebetween. As explained earlier, an overlay may include VTEPs which may be either virtual or physical switch ports. The VTEPs may encapsulate data packets entering the overlay from a source device and de-encapsulate the data packets when they leave the overlay. The overlay 208 may be deployed using an underlying layer of switches referred to as the underlay (now shown). In the overlay 208, the network device 206-1 is configured as a VTEP and the network device 206-2 is configured as another VTEP. In some examples, the VTEP implemented at the network device 206-1 is referred to as a first VTEP or a client-side VTEP and the VTEP implemented at the network device 206-2 is referred to as a second VTEP2 or a host-side VTEP. The VTEPs may connect to each other via virtual tunnels in the overlay 208.

In FIG. 1 above, the functionalities of the client-side VTEP is explained. FIG. 2 is focused on the description of functionalities of the host-side VTEP. As shown in FIG. 2, the network device 206-2 may include a processor 210 and a memory 212 that may be coupled to each other through a communication link (e.g., a bus). Processor 210 may be similar to processor 110 of FIG. 1 and memory 212 may be similar to memory 112 of FIG. 1.

Memory 212 stores instructions to be executed by processor 210 including instructions for multicast service announcement receiver 214, service announcement manager 216, and announcement routing manager 218.

The processor 210 may execute a multicast service announcement receiver 214 to receive, from the host device 202 connected to the network device 206-2, a multicast service announcement. The multicast service announcement comprises a host name of the host device 202 and a service name of a service advertised by the host device 202. The multicast service announcement is indicative of an advertisement, from the host device 202, of a service provided by the host device 202. In some examples, the multicast service announcement is a multicast Domain Name System (mDNS) pointer (PTR) record with a time to live (TTL) of 1 second. The PTR record comprises the name of the service mapped to the name of a specific instance of the service. The host device 202 may send the multicast service announcements periodically or episodically. In some examples, the network device 206-2 may also query the host device 202 for the multicast service announcement. Each multicast service announcement comprises a host name, an IP address of the host device 202, and a service name of a service provided by the host device 202.

On receiving the multicast service announcement, the processor 110 may execute a service announcement manager 216 to identify a set of overlay network paths connecting the second VTEP to other VTEPs in the overlay network 208. In an example, each overlay network path may comprise an L2VNI/L3VNI and an IP address of a remote VTEP associated with the L2VNI/L3VNI. Thus, the service announcement manager 216 may search the VNIs configured in the second VTEP implemented in the network device 206-2. In some examples, the service announcement manager 216 may check the interfaces in the second VTEP to identify peer VTEPs of the second VTEP. In some examples, when two host devices are locally connected to the same peer VTEP, there could be multiple overlay network paths corresponding to that peer VTEP. In such cases, one of the multiple overlay network paths are included in the set of overlay network paths. In other words, each of the set of overlay network paths are unique in the sense that each path provides reachability information between the second VTEP and a different VTEP. In the example of FIG. 2, the first VTEP is configured as a peer VTEP of the second VTEP. Thus, the service announcement manager 216 may identify an overlay network path for the first VTEP as well. In some examples, the first VTEP and the second VTEP may be configured in a single overlay network segment. In some other examples, the first VTEP and the second VTEP may be configured in different overlay network segments.

The processor 210 may execute a service announcement manager 216 to create a set of copies of the multicast service announcement. Each of the copies of the multicast service announcement are to be forwarded along a respective overlay network path from the set of overlay network paths. Thus, depending on a number of overlay network paths in the set, the number of copies the multicast service announcement may be created.

Further, the processor 210 may also execute a service announcement manager 216 to encapsulate each of the copies of the service announcement based on an overlay encapsulation protocol implemented at the second VTEP. In some examples, encapsulating each of the copies of service announcement comprises performing a MAC-in-UDP encapsulation, such that a header is added to each copy of the service announcement. In some examples, the header comprises at least a portion of the respective overlay network path along which it us to be routed. In some examples, the original service announcement may be an L2 frame to which a VXLAN header is added and then it is placed in a UDP-IP packet. In some examples, during encapsulation of each of the copies of the service announcement, the processor 110 may further associate a role tag and a location tag of the host device 202 with each of the copies of the encapsulated multicast service announcement. The role tag is indicative of role-based access policies of the host device 202 and the location tag indicative of a geographical region where the host device 202 is located.

The processor 210 may execute the announcement routing manager 218 to route each of the encapsulated copies of the multicast service announcement to each of the remote VTEPs via the respective overlay network paths. Thus, each remote VTEP in the overlay network 208 may receive the service announcement from the host device 202. Each of the remote VTEPs may store the multicast service announcements from different host devices, such as the host device 202, and respective overlay network paths via which they are received in a resource record. Thus, the resource record is created in each of the VTEPs in the overlay network 208. The resource record may be used by a VTEP while fetching a host name associated with a service queried by a client device associated with the VTEP.

Figure 3:
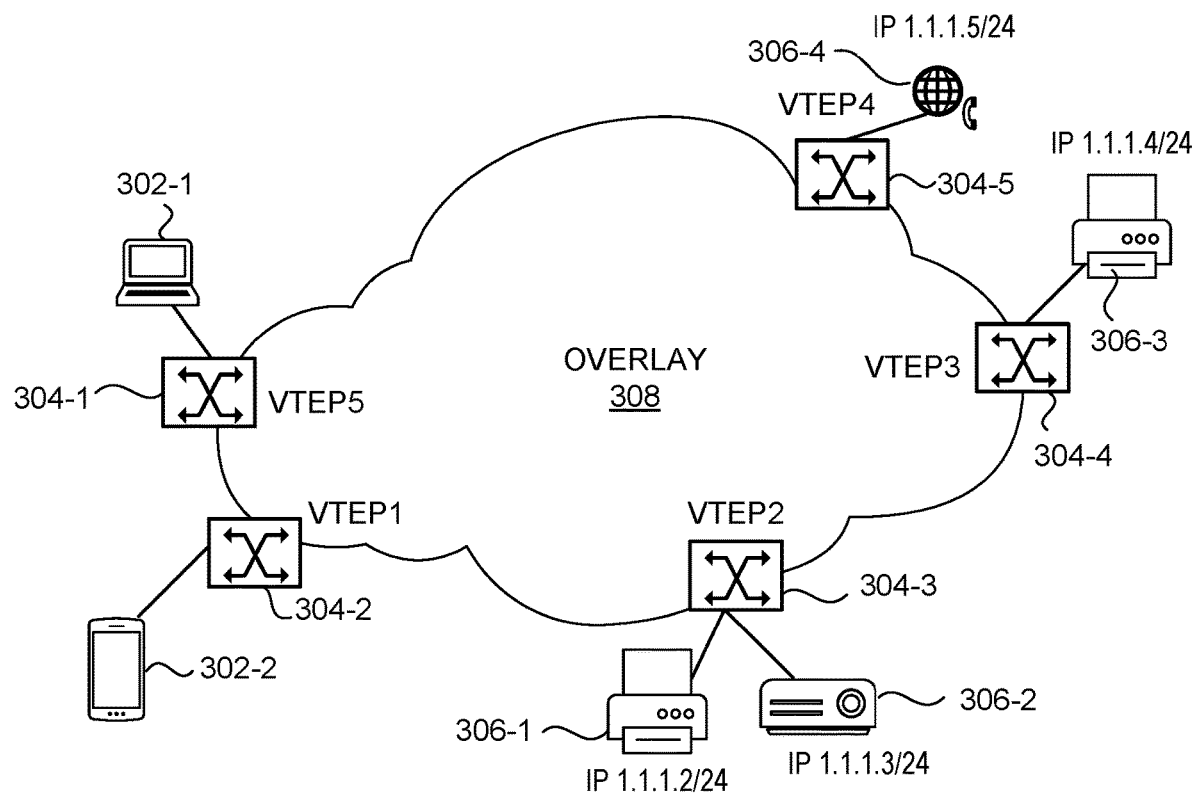
FIG. 3 schematically illustrates another network environment for service discovery across VTEPs in an overlay network, according to an example.

FIG. 3 schematically illustrates a network environment 300 for service discovery across VTEPs in an overlay network, according to an example. The network environment 300 comprises multiple client devices 302-1 and 302-2 connected to different network devices. The client devices 302 depicted in FIG. 3 may be representative of an example of the client device 104 described in FIG. 1. Similarly, the network devices 304-1 to 304-5, as depicted in FIG. 3, may be representative of an example of the network device 106-1 or 106-2 described in FIG. 1. The network devices 304-1 to 304-5 may collectively be referred to as network devices 304. As shown in FIG. 3, the client device 302-1 is connected to network device 304-1 and the client device 302-2 is connected to network device 304-2. The client devices 302-1 and 302-2 may be connected to network devices 304-1 and 304-2, respectively, via an ethernet cable connected to access ports of the network devices.

The network environment 300 further comprises multiple host devices 306-1 to 306-4 connected to different network devices. The host devices 306-1 to 306-4 may be collectively referred to as host devices 306. The host devices 306 depicted in FIG. 3 may be representative of an example of the host device 102 described in FIG. 1. As shown in FIG. 3, the host devices 306-1 and 306-2 are connected to network device 304-3. The host device 306-3 is connected to the network device 304-4 and the host device 306-4 is connected to network device 304-5. The host devices 306-1 to 306-4 may be connected to network devices 304-3 to 304-5, respectively, via an ethernet cable connected to access ports of respective network devices. Each of the access ports comprise interfaces of the network device, which may include, for example, RJ45 jacks. Each access port may be configured to receive a connector of an ethernet cable, which may include an RJ45 connector. The client devices 302 may be connected to the host devices 306 via a Local Area Network (LAN) or a Wide Area Network (WAN). The client devices 302 may communicate with the host devices 306 via an overlay 308. The overlay 308 may be representative of the overlay 108 described in FIG. 1. Each of the network devices 304 may be configured as a VTEP in the overlay 308. Thus, network device 304-2 implements VTEP1, network device 304-3 implements VTEP2, network device 304-4 implements VTEP3, network device 304-5 implements VTEP4, and network device 304-1 implements VTEP5. In the description of FIG. 3, functions or steps performed by a network device may be alternatively referred to as functions or steps performed by a VTEP implemented at the network device. As may be noted, in the example of FIG. 3, the client devices 302 and the host devices 306 are connected to different VTEPs. For the purpose of the description of FIG. 3, consider that client device 302-2 connected to VTEP1 intends to access a printing service. For ease of explanation, sometimes VTEP1 is also referred to as a first VTEP and VTEP2 is referred to as a second VTEP.

In some examples, the host device 306-1 may periodically or episodically send a multicast service announcement to the network device 304-3. The multicast service announcement may include a host name (or domain name, such as, Local-print-Floor1) of the host device 306-1 and a service name (i.e., print serv) of the service advertised by the host device 306-1. Examples of the multicast service announcement may be an mDNS PTR record. In an example, the host device 306-1 may be a printer advertising a printing service having a service name "print serv". The multicast service announcement received by the second VTEP is in the form of an L2 frame. Since the multicast service announcement is received from a locally connected host device 306-1, the multicast service announcement is not encapsulated. The second VTEP may receive the multicast service announcement via a switch interface. The switch interface refers to a physical interface of the VTEP in local LAN segment to support local endpoint communication. The second VTEP also has an IP interface which refers to a virtual interface of the VTEP for communication with another VTEP via the IP network. Similarly, the host device 306-2 may also send a multicast service announcement to the second VTEP. In an example, the host device 306-2 may be a smart projector advertising a projector service having a service name "proj scrn". In some examples, the second VTEP may also send requests to the host devices 306-1/306-2 asking for the service announcements.

On receiving the multicast service announcements, the second VTEP may create a local host list. The local host list comprises a list of host names, host IP addresses, and service names of services provided by the host devices 306-1 and 306-2 locally connected to the second VTEP. Further, generally the host devices are static wired devices. Thus, an identifier for a location for such host devices may be entered statically when the device is authenticated using an authentication server (such as RADIUS). The second VTEP may convert this identifier to a location tag by hashing. The location tag of the host devices 306-1 and 306-2 may also be stored in the local host list. Further, a role of the host devices 306-1 and 306-2 may be determined by the second VTEP. The role of a host device may define what type of traffic the host device may be able to send/receive as well as what other devices/users/roles that traffic may be sent to. Thus, hosts grouped under a "guest role" may be accessed by client devices which are assigned under the identical "guest role". The entities or devices categorized under a single role are subject to similar access policies or privileges. Based on the role assigned to the host devices 306-1 and 306-2, the second VTEP may assign a role tag for the host devices 306-1 and 306-2. The role tag may be an identifier indicative of a specific role assigned to a set of devices or entities. The role tag of the host device 306-1 and 306-2 may also be stored in the local host list. In an example, the local host list created in the second VTEP is shown in "Table 1" below.

TABLE 1

| Host IP | Service name | Role tag | Location tag |
|---|---|---|---|
| 1.1.1.2/24 | "print serv 1" | Guest | 101 |
| 1.1.1.3/24 | "proj scrn" | Admin | 101 |

As can be seen from the local host list in table 1, the host device 306-1 has an IP address 1.1.1.2/24, provides a printing service "print serv 1", is assigned to a "Guest" role, and has a location tag "101" indicative of a particular location in a building/floor. Host device 306-2 has an IP address 1.1.1.3/24, provides a screen projecting service "proj scrn", is assigned to an "Admin" role, and has a location tag "101". Similarly, the VTEP3 and VTEP4 implemented in network devices 304-4 and 304-5, respectively, may maintain a respective local host list with multicast service announcements from their respective locally connected host devices 306-3 and 306-4.

Further, the second VTEP is configured to identify a set of overlay network paths connecting the second VTEP to other VTEPs in the overlay 308. In an example, the second VTEP may identify an L2VNI/L3VNI configured in the second VTEP and remote VTEPs which have the identical L2VNI/L3VNI. By identifying remote VTEPs which are part of identical L2VNIs/L3VNIs as those configured in the second VTEP, the second VTEP may be able to identify the set of overlay network paths connecting the second VTEP to other VTEPs in the overlay 308. In an example, the second VTEP (VTEP2) may identify the IP addresses of VTEP1, VTEP3, VTEP4, and VTEP5 and an L2VNI/L3VNI connecting VTEP1 to each of these VTEPs.

The network device 304-3 may create a set of copies of the multicast service announcement. Each of the copies of the multicast service announcement is to be forwarded along a respective overlay network path from the set of overlay network paths. Thus, a number of copies in the set is identical to a number of overlay network paths that are identified. The network device 304-3 may perform a replication of the multicast service announcement to create the set of copies.

Figure 7:
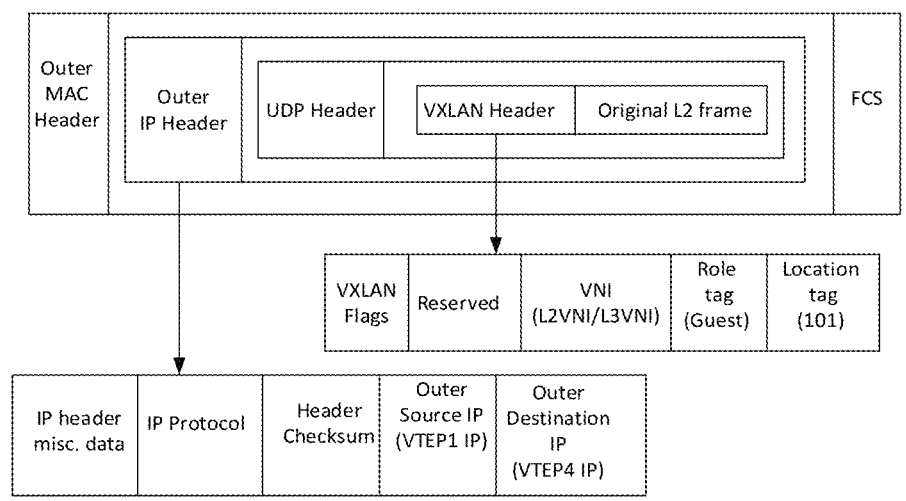
FIG. 7 illustrates an encapsulated multicast service announcement, according to an example.

The network device 304-3 may further encapsulate each of the copies of the multicast service announcement based on an overlay encapsulation protocol implemented at the second VTEP. In an example, the encapsulation may be a MAC-in-UDP encapsulation based on VXLAN. The copy of the multicast service announcement which is a L2 frame may be encapsulated within a UDP datagram. In some examples, the encapsulated copy of the multicast service announcement comprises an outer IP address that is an IP address of one of the VTEPs (VTEP1/VTEP3/VTEP4/VTEP5) in the overlay 308 and a VXLAN header which comprises an L2VNI/L3VNI and the role tag of the host device (such as host device 306-1) from which the multicast service announcement had originated. Example of an encapsulated multicast service announcement originating from the host device 306-1 addressed to the client device 302-2 is shown in FIG. 7.

An example "original L2 frame" may refer to the multicast service announcement. In some examples, the "original L2 frame" comprises an mDNS L2 header, an mDNS IP header, and an mDNS payload. In an example, the "VXLAN header" is added to the "original L2 frame by way of the encapsulation. As may be seen, the "VXLAN header" comprises a VNI indicative of the overlay network segment via which the encapsulated copy of the multicast service announcement is to be forwarded. Further, the role tag, i.e., "Guest" and location tag, i.e., "101" of the host device 306-1 is also included in the "VXLAN header". The "outer IP header" may include an "outer source IP" that is the IP address of the VTEP (VTEP 2 in this case) that encapsulates the copy of the multicast service announcement. Similarly, the "outer IP header" also includes an "outer destination IP" which is the IP address of the VTEP (VTEP1 in this case) which de-capsulates the copy of the multicast service announcement. The overlay network path between the second VTEP (VTEP2) and the first VTEP (VTEP1) may be indicated by the L2VNI/L3VNI configured in VTEP2 and VTEP1 and IP address of the destination VTEP, i.e., VTEP1. As may be noted, a portion of the overlay network path between VTEP2 and VTEP1 (i.e., the VNIs and IP address of VTEP1) is included in the encapsulated copy of the multicast service announcement. Similarly, each of the encapsulated copies of the multicast service announcement comprises at least a portion of the respective overlay network path along which it is to be routed. In this example, VTEP2 may create copies of the multicast service announcement each of which may be routed to VTEP1, VTEP3, VTEP4, and VTEP5. In each of the encapsulated copies of the multicast service announcements to be forwarded to these VTEPs, a portion of the respective overlay network paths may be included. Further, as explained above, the network device 304-3 also associates the role tag and the location tag of the host device 306-1 with each of the copies of the encapsulated multicast service announcement (for example, within the reserved fields of the VXLAN header of the encapsulated copies).

The network device 304-3 (implementing VTEP2) may then route each of the encapsulated copies of the multicast service announcement to each of the other VTEPs (i.e., VTEP1, VTEP3, VTEP4, and VTEP5) via the respective overlay network paths. Since, the copies of the multicast service announcement are routed to specific VTEPs via specific overlay network paths, these copies are not flooded in the L2VNIs of the source VTEP (VTEP2 in this example) thereby avoiding excessive bandwidth consumption in the overlay 308.

In the above description, routing of encapsulated copies of the multicast service announcement by the network device 304-3 (implementing second VTEP) to other VTEPs in the overlay 308 is explained. Similarly, network devices 304-4 and 304-5 may also send encapsulated multicast service announcements to all other VTEPs. Let us consider the encapsulated multicast service announcements received by VTEP1. In particular, the network device 304-2 (implementing VTEP1) may receive an encapsulated multicast service announcement of the host device 306-1 from the VTEP2, via an overlay network path. As explained earlier, the encapsulated multicast service announcement comprises the host name, the host IP address, the service name, the location tag, and the role tag of the host device 306-1.

On receiving the encapsulated multicast service announcement, the network device 304-2 may create a record entry associating the respective overlay network path with the service name and the host name. In some examples, the network device 304-2 may assign the L2VNI/L3VNI and the VTEP IP from where the encapsulated multicast service announcement is received with the host name, service name, and host IP to create the record entry. The record entry is stored in a resource record maintained at the first VTEP. The "resource record" refers to a list of IP addresses of host devices associated with respective host names, service names, role tags, overlay network paths, and location tags which may be stored inside VTEPs in an overlay network. The first VTEP (VTEP1) may receive copies of multicast service announcements from each of VTEP2, VTEP3, and VTEP4 locally connected to host devices 306-1, 306-2, 306-3, and 306-4. Based on all these encapsulated service announcements from the host devices 306, the network device 304-2 may create the resource record. Thus, an example resource record created at the first VTEP is shown in "Table 2" below:

TABLE 2

| Host name | Host IP | Service name | Overlay network path | Role-Location tag |
|---|---|---|---|---|
| Local-print-Floor1 | 1.1.1.2/24 | print serv | L2VNI100, <VTEP2 IP address> | Guest 101 |
| Office Projector | 1.1.1.3/24 | proj scrn | L2VNI100, <VTEP2 IP address> | Admin 101 |
| Local-print-Floor2 | 1.1.1.4/24 | print serv | L3VNI10010, <VTEP3 IP address> | Employee 105 |
| Office tel | 1.1.1.5/24 | IP phone | L2VNI200, <VTEP4 IP address> | Employee 110 |

The network device 304-2 may receive, from the client device 302-2, a multicast query for a printing service named "print serv" advertised by a host device, such as host devices 306-1 and 306-3. The multicast query comprises the service name (print serv) of the service. Consider that the client device 302-2 is associated with a "guest" role.

On receiving the multicast query, the network device 304-2 determines whether a host name, of the host device, corresponding to the service name (print serv) is present in the resource record (an example of which is shown in table 2) of the network device 304-2. Referring to the example resource record of table 2, the network device 304-2 may determine that two host devices with host names "Local-print-Floor1" and "Local-print-Floor2" are advertising the service named "print serv".

In some examples, the network device 304-2 may also identify a role tag and a location tag for the client device 302-2. As mentioned earlier, the client device 302-2 is assigned a role tag "guest". The role tag may be assigned to the client device 302-2 by an authentication server based on authentication credentials of the client device 302-2. In some examples, the role tag may also be assigned on a per port basis. That is each access port of the network device 304-2 may be assigned a particular role. Depending on which port is used to connect the client device 302-2 to the network device 304-2, the role tag may be assigned. Further, the location tag 101 may be assigned to the client device 302-2 based on a static location assignment during authentication of the client device 302-2.

In response to determining that a host name corresponding to the service name (print serv) is present in the resource record, the network device 304-2 may determine that the host name, in the resource record, corresponds to the role tag and the location tag. With reference to the example of FIG. 3, the network device 304-2, may determine that host device 306-1 having host name "Local-print-Floor1" and host IP "1.1.1.2/24" has a role tag ("Guest") and location tag (101) matching with those assigned to the client device 302-2. Thus, the network device 304-2 identifies that the host device 306-1 corresponding to the service name "print serv", location tag "101", and role tag "guest" is present in the resource record (an example of which is shown in table 2). It may be noted that, though the host device 306-3 having host name "Local-print-Floor2" advertises the same service "print serv" queried by the client device 302-2, however, the host device 306-3 is associated with a role tag "Employee" and a location tag, "105" which does not match with the role tag "Guest" and location tag "101" of the client device 302-2. Hence, the host device 306-3 is disregarded by the network device 340-2.

In response to determining that the host name (Local-print-Floor1) corresponding to a matching service name "print serv", role tag "Guest", and location tag "101" is present in the resource record, the network device 304-2 may identify, from the resource record, an overlay network path corresponding to the host name (Local-print-Floor1). Thus, the network device 304-2 may identify an "L2VNI100" and "<VTEP2 IP address>" as the overlay network path corresponding to the host name "Local-print-Floor1" of the host device 306-1. The network device 304-2 may further encapsulate the multicast query based on an overlay encapsulation protocol implemented at the first VTEP i.e., VTEP1. In an example, the encapsulation may be a VXLAN based MAC-in-UDP encapsulation. The encapsulated multicast query comprises at least a portion of the overlay network path. For example, the encapsulated multicast query may comprise the "L2VNI100" within the VXLAN header and the "<VTEP2 IP address>" as the outer destination IP included as part of the outer IP header. In response to determining that a host name corresponding to the service name, role tag, and location tag is absent in the resource record, the network device 304-2 may drop/discard the multicast query.

Further, the network device 304-2 may route, the encapsulated multicast query via the overlay network path (i.e., via the "L2VNI100" and the "<VTEP2 IP address>"), to the host device (i.e., host device 306-1 in this example). Thus, the second VTEP (VTEP2) may receive the encapsulated multicast query originating from the client device 302-2. The second VTEP (VTEP2) may decapsulate the multicast query and may send the decapsulated multicast query to the host device 306-1. The host device 306-1 on receiving the multicast query may respond to such query. Thus, the client device 302-2 connected to a VTEP (VTEP1) may discover a host device 306-1 connected to a different VTEP (VTEP2) via an overlay network path ("L2VNI100" and the "<VTEP2 IP address>") that is identified from a resource record (of table 2) maintained in the VTEP (VTEP1) locally connected to the client device 302-2. Routing of the multicast query from the client device along the overlay network path allows the client device to discover a service advertised by the host device without flooding the multicast query to other VTEPs in the overlay 308, thereby preventing wastage of bandwidth. Further, since the host device 306-1 has matching role tag and location tag as that of the client device 302-2, the routing of the multicast query via the overlay network path is also role-specific and location-specific.

Figure 4:
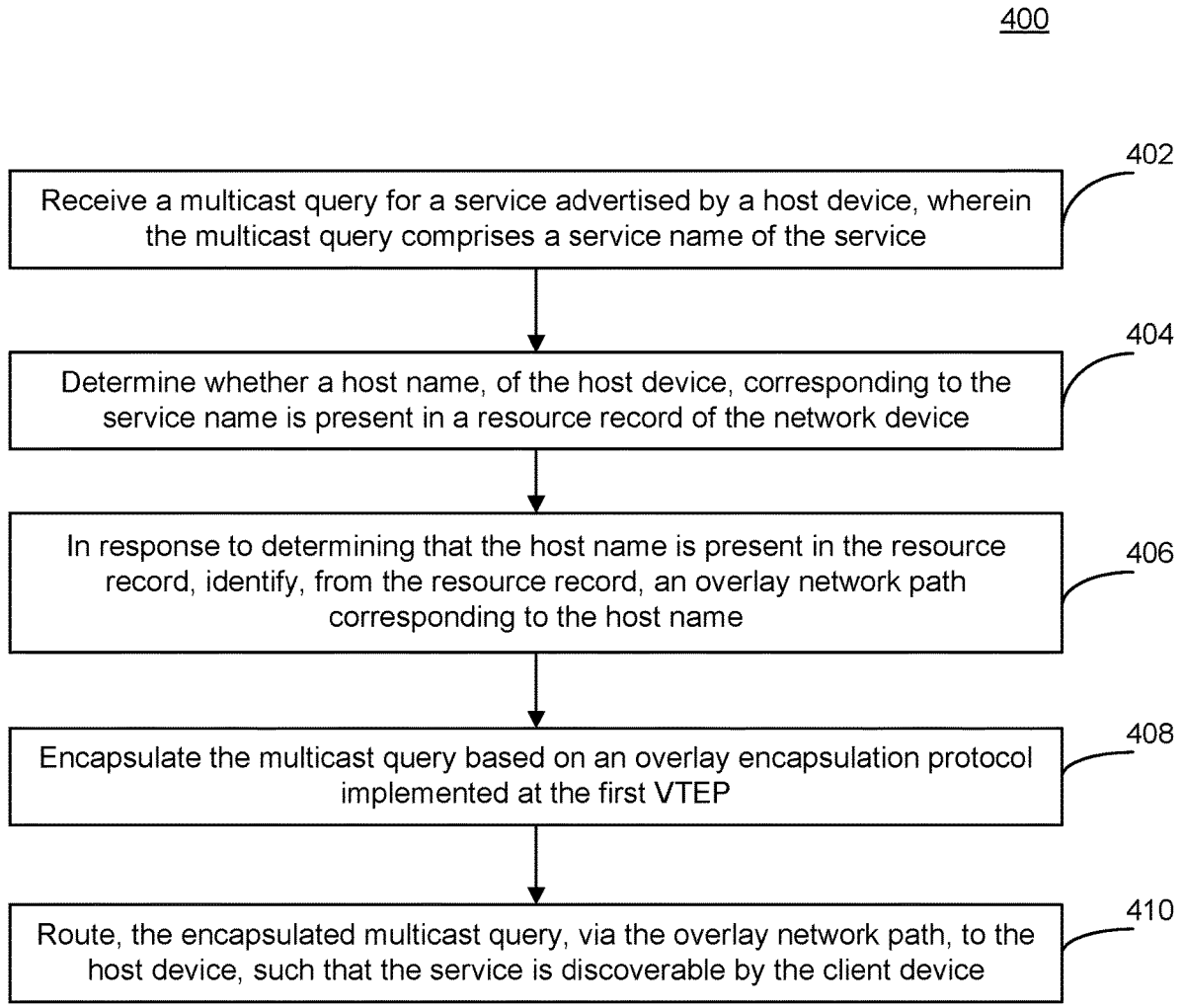
FIG. 4 is a flowchart illustrating a method for service discovery across VTEPs in an overlay network, according to an example.

FIG. 4 is a flowchart illustrating a method 400 for service discovery across VTEPs in an overlay network, according to an example. Method 400 may be executed on a network device, such as the network device 106-1 in the network environment 100 of FIG. 1. The network device may be configured as a VTEP in an overlay network. The overlay network comprises other VTEPs to which host devices, such as the host device 102 of FIG. 1, may be connected.

At block 402, the network device may receive a multicast query, for a service, from a client device, such as the client device 104 of FIG. 1. In some examples, the multicast query refers to a multicast IP packet based on service discovery protocols originating from a client device attempting to access a specific service in a network. The multicast query may comprise a service name of the service that the client device is attempting to access. In some examples, the multicast query may be a service query based on multicast Domain Name System (mDNS) protocol. In some examples, the multicast query comprises an SRV record and a TXT record. A Service record (SRV record) refers to a specification of data in DNS defining the hostname and port number, of a host device providing the service that is queried by the client device. A TXT refers to a specification of data in DNS that allows a domain administrator to associate text values (strings) with domain names of host devices. In some examples, the service name of the service queried by the client device may be included in the SRV records or the TXT records.

On receiving the multicast query for the service, at block 404, the network device may determine whether a host name, corresponding to the service name, is present in a resource record of the network device. In some examples, the resource record comprises a list of host names of host devices connected to VTEPs in an overlay network, respective service names, respective IP addresses, and respective overlay network paths. In some examples, the resource record may also comprise respective role tags and locations tags for each of the host devices. The resource record may be created based on multicast service announcements received from host devices connected to VTEPs in the overlay.

In some examples, the network device may determine whether the host name corresponds to a role tag and a location tag of the client device. The role tag of the client device refers to role-based access policies of the client device. The network device may assign a role tag to the client device based on one of a port address via which the client device is connected to the network device, a MAC address of the client device, or based on authentication information of the client device. In some examples, the network device may be configured such that an access port of the network device is assigned to a particular role. Thus, based on the port at which the client device is connected to the network device, the network device may assign a role tag to the client device. Similarly, a MAC address to role mapping may be configured in the network device. Using the MAC address to role mapping and the client device's MAC address, the network device may assign a role tag to the client device. In some examples, the assignment of a role tag to the client device is performed by an authentication server (such as RADIUS). When the client device connects to the network device and provides its authentication credentials, then based on its authentication credentials, the authentication server may assign a role tag to the client device and share the role tag with the network device. The network device may apply access policies and privileges based on the assigned role tag. The network device may also assign a location tag to the client device either statically or based on the location of a wireless access point from which the multicast query is received. On identifying the role tag and location tag assigned to the client device, the network device may check the resource record to determine whether the host name corresponds to the role tag and the location tag of the client device. That is, the resource record manager may check whether the role tag and location tag of the host device matches with the role tag and location tag of the client device in addition to checking whether the queried service is provided by the host device.

In response to determining that the host name, corresponding to the service name, is present in the resource record, at block 406, the network device may identify, from the resource record, an overlay network path corresponding to the host name. The overlay network path is indicative of reachability information of the host device in the overlay network. In some examples, the overlay network path comprises an L2 Virtual Network Instance (VNI) used to forward traffic in an L2 overlay network or an L3 VNI used to forward traffic in an L3 overlay network and an IP address of a destination VTEP connected with the host device. L2VNI refers to an identifier for a specific overlay network segment comprising endpoints (VTEPs) within the same IP subnet. An L2VNI allows forwarding of bridged encapsulated traffic between two devices in the same subnet in a L2 overlay network. L3VNI refers to an identifier for a specific overlay network segment comprising endpoints (VTEPs) in different IP subnets. An L3VNI along with a virtual router (i.e., a virtual routing and forwarding (VRF) instance) allows routing of encapsulated traffic between two devices in different subnets in a L3 overlay network. The overlay network path provides a virtual communication link between a VTEP locally connected to the client device and another VTEP locally connected to the host device via the overlay. In some examples, the virtual communication link may be a virtual tunnel connecting the two VTEPs.

Once the overlay network path is identified, at block 408, the network device may encapsulate the multicast query. In some examples, the network device may implement an overlay encapsulation protocol in its VTEP to encapsulate the multicast query. The overlay encapsulation protocol also called a tunneling protocol is a communication protocols in which logically separate functions in a network (the overlay) are abstracted from their underlying structures (the underlay) by implementing higher-level objects. Examples include GENEVE, GRE, SSH, VXLAN, and NVGRE. As a result of encapsulation one or more headers may be added to the multicast query. At least a portion of the overlay network path may be included in one of such headers. In some examples, the portion of the overlay network path included in the headers comprises the IP address of the VTEP connected to the host device. In some examples, the encapsulation may be VXLAN encapsulation of a Media Access Control (MAC) frame within a User Datagram Protocol (UDP) datagram for transport across an IP network.

At block 410, the network device may route the encapsulated multicast query, via the overlay network path, to the host device. In some examples, the encapsulated multicast query may be routed via the overlay network path, i.e., the virtual tunnels identified by the L2VNI and/or L3VNI and the IP address of the VTEP connected to the host device. On being routed along the overlay network path, the multicast query may reach the VTEP connected to the host device and finally to host device. On receiving the multicast query, the host device may send a response agreeing to provide the service along the same overlay network path. Thus, the client device connected to a VTEP may discover and access the service advertised by a host device connected to a different VTEP via the overlay network path. Identification of the overlay network path allows routing the multicast query in a specific route, (i.e., from client-side VTEP to the host-side VTEP (VTEP2) via a virtual tunnel defined by the overlay network path) which prevents unnecessary flooding of the multicast query to other VTEPs in the overlay, thereby preventing wasteful bandwidth consumption in the overlay.

Figure 5:
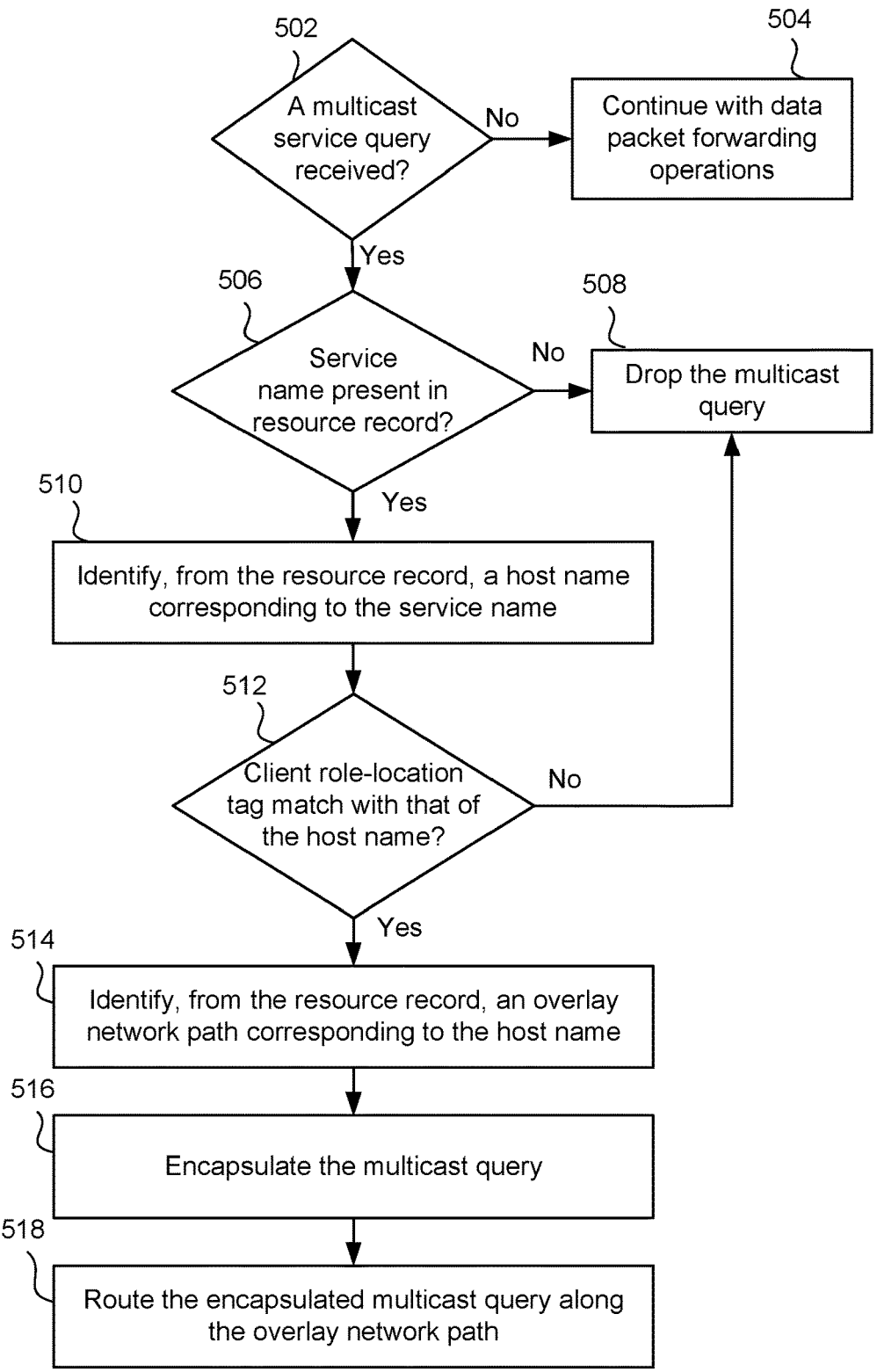
FIG. 5 is a flowchart illustrating another method for service discovery across VTEPs in an overlay network, according to an example.

FIG. 5 is a flowchart illustrating a method 500 for service discovery across VTEPs in an overlay network, according to an example. Method 500 may be executed on a network device, such as the network device 106-1 in the network environment 100 of FIG. 1. The network device may be configured as a VTEP in an overlay network to which a client device, such as the client device 104 of FIG. 1, may be locally connected. Thus, the steps of method 500 may be performed by a client-side VTEP. The overlay network comprises other VTEPs to which host devices, such as the host device 102 of FIG. 1, may be connected. The overlay network may be similar to the overlay network 108 of FIG. 1.

At block 502, the network device may check whether a multicast query for a service is received. The network device may implement a VTEP which connects to the client device. The service may be provided by a host device connected to another VTEP in the overlay network. In an example, the multicast query may be an mDNS SRV or TXT record comprising a service name of the service being queried by the client device.

In response to determining that no multicast query is received, ("No" branch from block 502), at block 504, the network device may continue with its data forwarding operations. The data forwarding operations may refer to usual operations of the network device for handling communication between different devices. In response to determining that the multicast query is received, at block 506, the network device may check whether the service name of the multicast query is present in a resource record. The resource record comprises a list of host names connected to VTEPs in the overlay network, respective service names, and respective overlay network paths. In an example, the resource record may be similar to the resource record shown in "Table 2".

In response to determining that the service name is not present in the resource record ("No" branch from block 506), at block 508, the network switch may drop the multicast query. Dropping the multicast query refers to discarding of the multicast query, wherein no further operations are carried on with respect to the multicast query by the network device. In response to determining that the service name is present in the resource record ("Yes" branch from block 506), at block 510, the network switch may identify a host name corresponding to the service name. The host name indicates a host device advertising the service with the service name. In some examples, the network device may also identify multiple host names corresponding to the service name. In a case where the same service is provided by multiple host devices connected to the overlay, then multiple host names corresponding to the service name may be identified by the network device.

At block 512, the network switch may check, the resource record, to find out which of the host names have a location tag and role tag matching that of the client device. The role tag and location of the client device may be identified by the network switch since the client device is locally connected to the network switch. In response to finding that the location tag and role tag of the host device does not match with that of the client device ("No" branch from block 512), the network switch may drop or discard the multicast query, at block 508.

In response to finding that the location tag and role tag of the host device does matches with that of the client device ("Yes" branch from block 512), at block 514, the network switch may identify, from the resource record, an overlay network path corresponding to the host name. The overlay network path is indicative of reachability information of the host device in the overlay network.

At block 516, the network switch may encapsulate the multicast query using a tunneling protocol, for example, VXLAN, GRE, or NVGRE. The encapsulated multicast query comprises at least a portion of the overlay network path. At block 518, the encapsulated multicast query is forwarded along the overlay network path to the host device advertising the queried service. Thus, the client device connected to a VTEP in the overlay may discover the service of a host device connected to a different VTEP in the overlay by routing the multicast query via an overlay network path.

Figure 6:
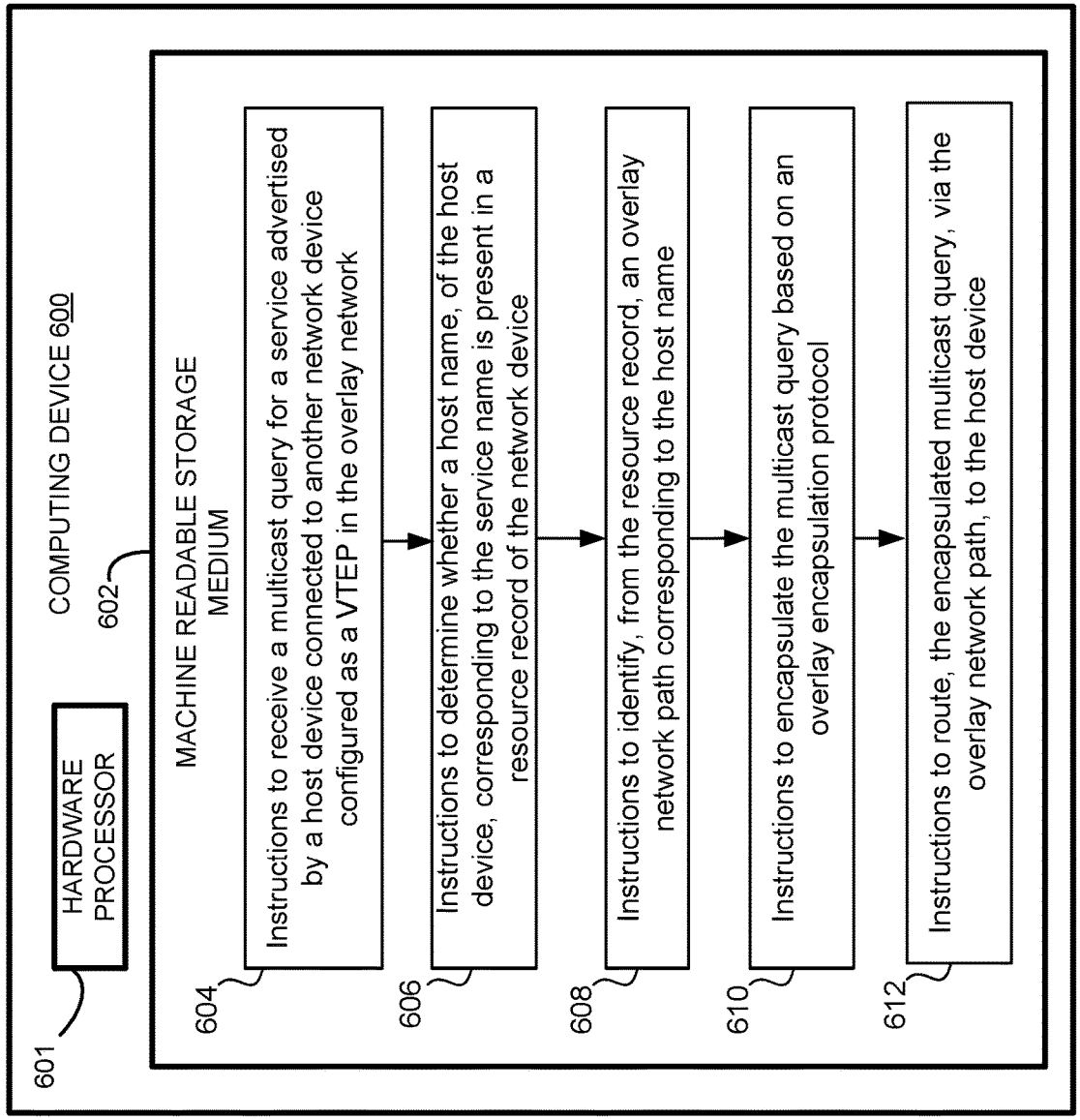
FIG. 6 illustrates a computing device for implementing the method for service discovery across VTEPs in an overlay network, according to an example.

FIG. 6 illustrates an example computing device 600, with a hardware processor 601, and accessible machine-readable instructions stored on a machine-readable medium 602 for implementing one example system, according to one or more disclosed example implementations. In an example, the computing device 600 may be a network device, such as the network devices 106, described above in reference to FIG. 1. FIG. 6 illustrates computing device 600 configured to perform instructions 604-612 described below. However, computing device 600 may also be configured to perform the flow of other methods, techniques, functions, or processes described in this disclosure, such as, for example the method 400 of FIG. 4.

A processing element such as processor 601 may contain one or more hardware processors, where each hardware processor may have a single or multiple processor cores. In one embodiment, the processor 601 may include at least one shared cache that stores data (e.g., computing instructions) that are utilized by one or more other components of processor 601. For example, the shared cache may be a locally cached data stored in a memory for faster access by components of the processing elements that make up processor 601. In one or more embodiments, the shared cache may include one or more mid-level caches, such as level 2 (L2), level 3 (L3), level 4 (L4), or other levels of cache, a last level cache (LLC), or combinations thereof. Examples of processors include but are not limited to a central processing unit (CPU) a microprocessor. Although not illustrated in FIG. 6, the processing elements that make up processor 601 may also include one or more of other types of hardware processing components, such as graphics processing units (GPU), application specific integrated circuits (ASICs), field-programmable gate arrays (FPGAs), and/or digital signal processors (DSPs).

The processor 601 may be operatively and communicatively coupled to a memory. The memory may be a non-transitory computer readable medium, such as the machine readable storage medium 602, configured to store various types of data. For example, the memory may include one or more storage devices that comprise a non-volatile storage device and/or volatile memory. Volatile memory, such as random-access memory (RAM), can be any suitable non-permanent storage device. The non-volatile storage devices can include one or more disk drives, optical drives, solid-state drives (SSDs), tap drives, flash memory, read only memory (ROM), and/or any other type of memory designed to maintain data for a duration of time after a power loss or shut down operation. In certain aspects, the non-volatile storage devices may be used to store overflow data if allocated RAM is not large enough to hold all working data. The non-volatile storage devices may also be used to store programs that are loaded into the RAM when such programs are selected for execution.

The machine-readable storage medium 602 of FIG. 6, may include both volatile and non-volatile, removable and non-removable media, and may be any electronic, magnetic, optical, or other physical storage device that contains or stores executable instructions, data structures, program module, or other data accessible to a processor, for example firmware, erasable programmable read-only memory (EPROM), random access memory (RAM), non-volatile random access memory (NVRAM), optical disk, solid state drive (SSD), flash memory chips, and the like. The machine-readable storage medium may be a non-transitory storage medium, where the term "non-transitory" does not encompass transitory propagating signals.

The machine readable medium 602 includes instructions 604 that, when executed by the processor 601, cause a network device to receive a multicast query, for a service, from a client device, such as the client device 104 of FIG. 1. In some examples, the multicast query refers to a multicast IP packet based on service discovery protocols originating from a client device attempting to access a specific service in a network. The multicast query may comprise a service name of the service that the client device is attempting to access. In some examples, the multicast query may be a service query based on multicast Domain Name System (mDNS) protocol. In some examples, the multicast query comprises an SRV record and a TXT record. A Service record (SRV record) refers to a specification of data in DNS defining the hostname and port number, of a host device providing the service that is queried by the client device. A TXT refers to a specification of data in DNS that allows a domain administrator to associate text values (strings) with domain names of host devices. In some examples, the service name of the service queried by the client device may be included in the SRV records or the TXT records.

On receiving the multicast query for the service, the machine readable medium 602 includes instructions 606 that, when executed by the processor 601, cause the network device to determine whether a host name, corresponding to the service name, is present in a resource record of the network device. In some examples, the resource record comprises a list of host names of host devices connected to VTEPs in an overlay network, respective service names, respective IP addresses, and respective overlay network paths. In some examples, the resource record may also comprise respective role tags and locations tags for each of the host devices. The resource record may be created based on multicast service announcements received from host devices connected to VTEPs in the overlay.

In some examples, the network device may determine whether the host name corresponds to a role tag and a location tag of the client device. The role tag of the client device refers to role-based access policies of the client device. The network device may assign a role tag to the client device based on one of a port address via which the client device is connected to the network device, a MAC address of the client device, or based on authentication information of the client device. In some examples, the network device may be configured such that an access port of the network device is assigned to a particular role. Thus, based on the port at which the client device is connected to the network device, the network device may assign a role tag to the client device. Similarly, a MAC address to role mapping may be configured in the network device. Using the MAC address to role mapping and the client device's MAC address, the network device may assign a role tag to the client device. In some examples, the assignment of a role tag to the client device is performed by an authentication server (such as RADIUS). When the client device connects to the network device and provides its authentication credentials, then based on its authentication credentials, the authentication server may assign a role tag to the client device and share the role tag with the network device. The network device may apply access policies and privileges based on the assigned role tag. The network device may also assign a location tag to the client device either statically or based on the location of a wireless access point from which the multicast query is received. On identifying the role tag and location tag assigned to the client device, the network device may check the resource record to determine whether the host name corresponds to the role tag and the location tag of the client device. That is, the resource record manager may check whether the role tag and location tag of the host device matches with the role tag and location tag of the client device in addition to checking whether the queried service is provided by the host device.

In response to determining that the host name, corresponding to the service name, is present in the resource record, the machine readable medium 602 includes instructions 608 that, when executed by the processor 601, cause the network device to identify, from the resource record, an overlay network path corresponding to the host name. The overlay network path is indicative of reachability information of the host device in the overlay network. In some examples, the overlay network path comprises an L2 Virtual Network Instance (VNI) used to forward traffic in an L2 overlay network or an L3 VNI used to forward traffic in an L3 overlay network and an IP address of a destination VTEP connected with the host device. L2VNI refers to an identifier for a specific overlay network segment comprising endpoints (VTEPs) within the same IP subnet. An L2VNI allows forwarding of bridged encapsulated traffic between two devices in the same subnet in a L2 overlay network. L3VNI refers to an identifier for a specific overlay network segment comprising endpoints (VTEPs) in different IP subnets. An L3VNI along with a virtual router (i.e., a virtual routing and forwarding (VRF) instance) allows routing of encapsulated traffic between two devices in different subnets in a L3 overlay network. The overlay network path provides a virtual communication link between a VTEP locally connected to the client device and another VTEP locally connected to the host device via the overlay. In some examples, the virtual communication link may be a virtual tunnel connecting the two VTEPs.

Once the overlay network path is identified, the machine readable medium 602 includes instructions 610 that, when executed by the processor 601, cause the network device to encapsulate the multicast query. In some examples, the network device may implement an overlay encapsulation protocol in its VTEP to encapsulate the multicast query. The overlay encapsulation protocol also called a tunneling protocol is a communication protocols in which logically separate functions in a network (the overlay) are abstracted from their underlying structures (the underlay) by implementing higher-level objects. Examples include GENEVE, GRE, SSH, VXLAN, and NVGRE. As a result of encapsulation one or more headers may be added to the multicast query. At least a portion of the overlay network path may be included in one of such headers. In some examples, the portion of the overlay network path included in the headers comprises the IP address of the VTEP connected to the host device. In some examples, the encapsulation may be VXLAN encapsulation of a Media Access Control (MAC) frame within a User Datagram Protocol (UDP) datagram for transport across an IP network.

Further, the machine readable medium 602 includes instructions 612 that, when executed by the processor 601, cause the network device to route the encapsulated multicast query, via the overlay network path, to the host device. In some examples, the encapsulated multicast query may be routed via the overlay network path, i.e., the virtual tunnels identified by the L2VNI and/or L3VNI and the IP address of the VTEP connected to the host device. On being routed along the overlay network path, the multicast query may reach the VTEP connected to the host device and finally to host device. On receiving the multicast query, the host device may send a response agreeing to provide the service along the same overlay network path. Thus, the client device connected to a VTEP may discover and access the service advertised by a host device connected to a different VTEP via the overlay network path. Identification of the overlay network path allows routing the multicast query in a specific route, (i.e., from client-side VTEP to the host-side VTEP (VTEP2) via a virtual tunnel defined by the overlay network path) which prevents unnecessary flooding of the multicast query to other VTEPs in the overlay, thereby preventing wasteful bandwidth consumption in the overlay.

A network device as used in the examples herein, is a device that receives network traffic and forwards the network traffic to a destination. Some network devices execute packets services, such as application classification and deep packet inspection, on certain network traffic that is received at the network device. Some network devices monitor load parameters for various physical and logical resources of the network device, and report load information to a network orchestrator or an orchestrator. A switch is an example of the network device.

A switch, as used in the examples herein, forwards data (in control packets) between a sender device and a recipient device (or multiple recipient devices) based on forwarding information (or equivalently, "routing information") accessible by the switch. The forwarding information can include entries that map network addresses (e.g., MAC addresses or IP addresses) and/or ports to respective network paths toward the recipient device(s).

Examples of client devices, as used herein, may include: laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like. Client devices may also be referred to as stations (STA).

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an openended fashion, and thus should be interpreted to mean "including, but not limited to . . . ". Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

We claim:

1. A network device, comprising:
   a processor;
   a non-transitory computer-readable storage medium storing instructions, which when executed by the processor causes the processor to:
      receive, from a client device connected to the network device configured as a first virtual tunnel endpoint (VTEP) in an overlay network, a multicast query for a service advertised by a host device connected to another network device 7 configured as a second VTEP in the overlay network, wherein the multicast query comprises a service name of the service;
      determine whether a host name, of the host device, corresponding to the service name is present in a resource record of the network device, wherein the resource record comprises entries associating host names connected to VTEPs in the overlay network with respective service names and respective overlay network paths;
      in response to determining that the host name, of the host device, corresponding to the service name, is present in the resource record, identify, from the resource record, an overlay network path corresponding to the host name, the overlay network path indicative of reachability information of the host device in the overlay network;
      encapsulate the multicast query based on an overlay encapsulation protocol implemented at the first VTEP, wherein the encapsulated multicast query comprises at least a portion of the overlay network path; and
      route, the encapsulated multicast query, via the overlay network path, to the host device, such that the service is discoverable by the client device.

2. The network device of claim 1, wherein the overlay network path comprises a layer 2 (L2) Virtual Network Instance (VNI) or a layer 3 (L3) VNI, and an IP address of the second VTEP.

3. The network device of claim 1, wherein, in response to determining that the host name is absent in the resource record, drop the multicast query.

4. The network device of claim 1, wherein the processor is further to:
   receive an encapsulated multicast service announcement of the host device from the second VTEP via the overlay network path, wherein the encapsulated multicast service announcement comprises the host name and the service name, of the host device;
   create a record entry associating the overlay network path with the service name and the host name; and
   store the record entry in the resource record maintained at the first VTEP.

5. The network device of claim 1, wherein the processor is further to:
   identify a role tag and a location tag for the client device, the role tag is indicative of role-based access policies of the client device and the location tag indicative of a geographical region where the client device is located; and
   determine that the host name, in the resource record, corresponds to the role tag and the location tag.

6. The network device of claim 1, wherein the client device and the host device are in a single broadcast domain.

7. The network device of claim 1, wherein the client device and the host device are in different broadcast domains.

8. The network device of claim 1, wherein the first VTEP and the second VTEP are in a single overlay network segment identified by a common layer 2 (L2) virtual network identifier (VNI).

9. The network device of claim 1, wherein the first VTEP is in a first overlay network segment identified by a first L2VNI and the second VTEP is in a second overlay network segment identified by a second L2VNI.

10. The network device of claim 1, wherein the first VTEP is in a first overlay network fabric and the second VTEP is in a second overlay network fabric.

11. The network device of claim 1, wherein the overlay encapsulation protocol is one of Virtual Extensible Local Area Network (VXLAN), Generic Network Virtualization Encapsulation (GENEVE), or Network Virtualization using Generic Routing Encapsulation (NVGRE).

12. The network device of claim 1, wherein the multicast query is a multicast Domain Name System (mDNS) service query.

13. The network device of claim 1, wherein the multicast query comprises one of an mDNS service record (SRV) and an mDNS text record (TXT).

14. A method for service discovery in an overlay network, comprising:
   receiving, by a network device from a client device connected to the network device configured as a first virtual tunnel endpoint (VTEP) in the overlay network, a multicast query for a service advertised by a host device connected to another network device configured as a second VTEP in the overlay network, wherein the multicast query comprises a service name of the service;
   determining, by the network device, whether a host name, of the host device, corresponding to the service name is present in a resource record of the network device, wherein the resource record comprises entries associating host names connected to VTEPs in the overlay network with respective service names and respective overlay network paths;
   in response to determining that the host name, of the host device, corresponding to the service name, is present in the resource record, identifying, by the network device from the resource record, an overlay network path corresponding to the host name, the overlay network path indicative of reachability information of the host device in the overlay network;
   encapsulating, by the network device, the multicast query based on an overlay encapsulation protocol implemented at the first VTEP, wherein the encapsulated multicast query comprises at least a portion of the overlay network path; and routing, by the network device, the encapsulated multicast query, via the overlay network path, to the host device, such that the service is discoverable by the client device.

15. The method of claim 14, wherein the overlay network path comprises a layer 2 (L2) Virtual Network Instance (VNI) or a layer 3 (L3) VNI, and an IP address of the second VTEP.

16. The method of claim 14, wherein, in response to determining that the host name is absent in the resource record, dropping the multicast query.

17. The method of claim 14, further comprising:
receiving an encapsulated multicast service announcement of the host device from the second VTEP via the overlay network path, wherein the encapsulated multicast service announcement comprises the host name and the service name, of the host device;
creating a record entry associating the overlay network path with the service name and the host name; and
storing the record entry in the resource record maintained at the first VTEP.

18. A network device comprising:
a processor;
a non-transitory computer-readable storage medium storing instructions, which when executed by the processor causes the processor to:
receive, from a host device connected to the network device, a multicast service announcement, wherein the multicast service announcement comprises a 6 host name of a host device and a service name of a service advertised by the host device, and wherein the network device is configured as a virtual tunnel endpoint (VTEP) in an overlay network;
identify a set of overlay network paths connecting the VTEP to other VTEPs in the overlay network;
create a resource record based on the multicast service announcement, wherein the resource record comprises an entry associating the host name of the host device connected to VTEPs in the overlay network with the service name and at least one of the identified overlay network paths,
receiving a multicast query for the service advertised by the host device, wherein the multicast query comprises the service name of the service;
in response to determining that the host name, of the host device, corresponding to the service name, is present in the resource record, identify, from the resource record, the at least one identified overlay network path;
create a set of copies of the multicast service announcement, each of the copies to be forwarded along a respective overlay network path from the set of overlay network paths;
encapsulate each of the copies based on an overlay encapsulation protocol implemented at the VTEP, wherein each of the encapsulated copies of the multicast service announcement comprises at least a portion of the respective overlay network path along which it is to be routed; and
route each of the encapsulated copies of the multicast service announcement to each of the other VTEPs via the respective overlay network path.

19. The network device of claim 18, wherein the multicast service announcement is a multicast Domain Name System (mDNS) pointer (PTR) record with a time to live (TTL) of 1 second.

20. The network device of claim 18, wherein the processor is further to associate a role tag and a location tag of the host device with each of the copies of the encapsulated multicast service announcement, the role tag is indicative of role-based access policies of the host device and the location tag is indicative of a geographical region where the host device is located.

* * * * *